Figure 1:
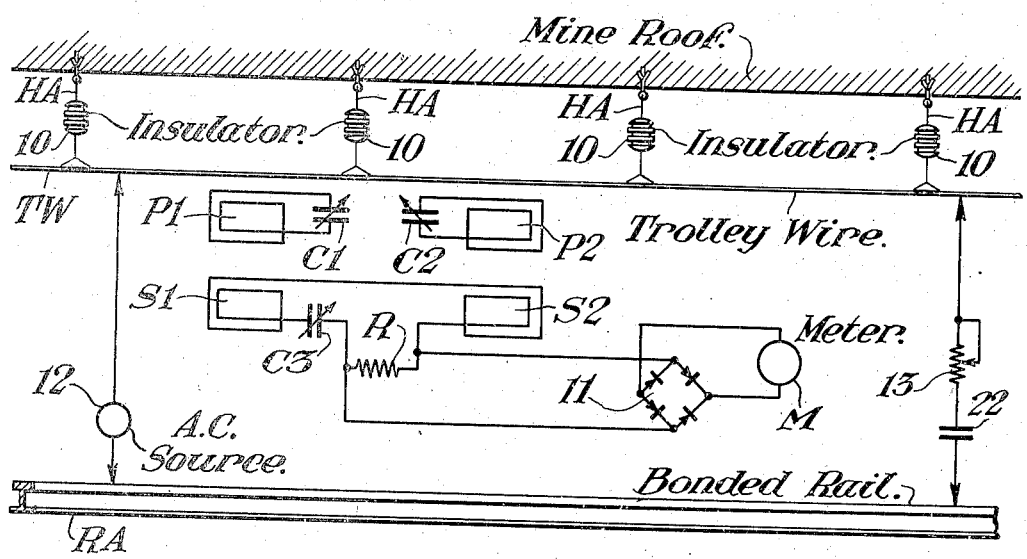

July 12, 1949.   A. J. SORENSEN   2,475,680
TEST EQUIPMENT FOR FAULTY ELECTRICAL INSULATORS
Filed March 14, 1946

INVENTOR
Andrew J. Sorensen.
BY
HIS ATTORNEY

Patented July 12, 1949

2,475,680

UNITED STATES PATENT OFFICE 2,475,680

TEST EQUIPMENT FOR FAULTY ELECTRICAL INSULATORS

Andrew J. Sorensen, Edgewood, Pa., assignor to The Union Switch & Signal Company, Swissvale, Pa., a corporation of Pennsylvania Application March 14, 1946, Serial No. 654,355

3 Claims. (Cl. 175—183)

My invention relates to test equipment for faulty electrical insulators, and more particularly to equipment to detect faulty insulators used in the supports of propulsion current conductors of electric railways.

The supports or hangers of third rails and trolley wires of electric railways include insulation portions or insulators. For example, in mines an electric railway for hauling out the coal or ore uses a trolley wire suspended from the roof of the mine, the trolley wire being suspended on short hangers spaced about 20 feet and each including an insulator. The propulsion current circuit includes the trolley wire as one side and the bonded rails as the return side, direct current of 200 to 600 volts being generally used for propulsion power. In mines, a faulty insulator of a hanger may result in the full voltage of the propulsion current being impressed between the trolley wire and the roof and a considerable amount of current may flow from the trolley wire into the roof and from there through various paths to the return rail system.

In coal mines, the roof consists of more or less combustible material and in all mines there is an accumulation of dust that may be combustible. The heat developed due to the relatively heavy current flowing at a faulty hanger can become intense enough to start a fire with attending chances of an explosion and danger to the lives of the miners. Furthermore, such a faulty hanger may result in a leakage current that creates a serious loss of power and such leakage current may be of a magnitude as to impair the operation of the system if there are a number of faulty insulators.

Accordingly, a feature of my invention is the provision of novel test equipment for faulty electrical insulators.

Another feature of my invention is the provision of novel means for locating faulty supports or hangers of the propulsion current conductor of an electric railway.

A more specific feature of my invention is the provision of improved means to detect faulty insulation of trolley wire hangers in coal mines.

Other features, objects and advantages of my invention will appear as the specification progresses.

To attain the foregoing features, objects and advantages of my invention, I provide two primary coils symmetrically spaced with the planes of both in a common plane. These two primary coils are preferably alike and each is connected to an individual capacitor which is adjustable so that each coil and its capacitor can be tuned to resonance at a given frequency. Two secondary coils are loosely coupled one to each of said primary coils, and the two secondary coils are connected in series through a tuning capacitor and a resistor. The secondary coils are preferably alike and are differentially arranged in such a manner that if the primary coils are placed symmetrically adjacent a trolley wire or conductor and a periodic or alternating current passed through such conductor, equal and opposite voltages are induced in the secondary coils and no voltage appears across the resistor. However, if the primary coils are disposed one on each side of a hanger, the insulator of which is faulty, there will be a difference between the voltages induced in the primary coils and in turn in the voltages induced in the secondary coils due to the difference in the current at the two sides of the hanger because a portion of the alternating current flows through the faulty insulator. Such difference in the induced voltages of the secondary coils creates a corresponding voltage across the resistor. A meter is connected across this resistor, the connection for the meter preferably including a full wave rectifier and the meter being of the direct current type.

Thus with the equipment properly adjusted, the meter indicates zero when the primary coils are placed near a trolley wire or like conductor with no insulator between them, and when placed adjacent the trolley wire with a good insulator between them, and the meter is moved away from its zero reading when the primary coils are placed adjacent a trolley wire with a faulty insulator between them.

A mine will ordinarily have several thousand trolley wire hangers and to facilitate the testing of the hanger insulators I preferably assemble the coils, capacitors and resistors of my equipment in a first assembly or unit adaptable of being carried on an auxiliary trolley pole of a mine locomotive so that the unit is carried just below the trolley wire as the locomotive moves along the track. The primary coils are arranged in this unit so that they will have a symmetrically inductive relationship with respect to the trolley wire. Thus as the locomotive moves along the track, the unit will pass under the hangers one after the other and there will be a point at each hanger at which the primary coils of the unit are symmetrically spaced one on each side of the hanger. A source of periodic or alternating current is preferably mounted on the locomotive and connected between the normal trolley wheel and the locomotive frame to supply an alternating current to the trolley wire.

The rectifier and meter of the equipment are assembled in a second unit that can be carried on the locomotive convenient for an operator riding on the locomotive to read the meter, the two equipment units being connected by suitable lead wires. With the equipment thus mounted on a locomotive and the locomotive run slowly through the mine, each faulty hanger insulator will cause a reading of the meter and thus detect such faulty insulation. A relay can be substituted for the meter and the relay can be used to control an indicator bell or light, or both. Furthermore, an automatic marker can be governed by the relay and each faulty insulator marked with white paint or the like.

I shall describe one form of apparatus embodying my invention and shall then point out the novel features thereof in claims.

Figure 2:
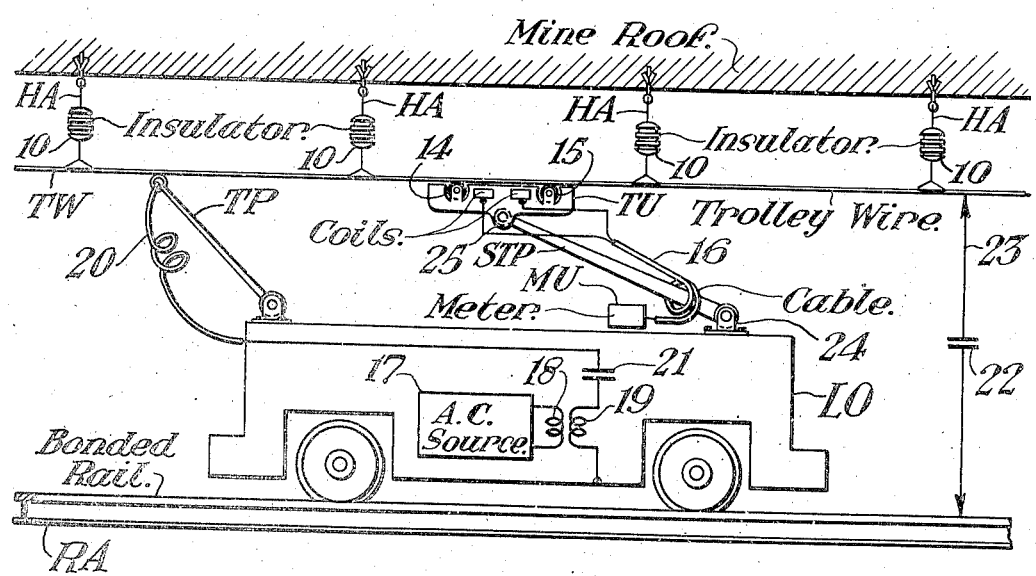

In the accompanying drawings, Fig. 1 is a diagrammatic view showing one form of apparatus embodying my invention when used to test the electrical insulators of a trolley wire in a mine. Fig. 2 is a diagrammatic view showing a preferred manner of mounting the apparatus of Fig. 1 on a mine locomotive to facilitate the testing of the trolley wire insulators.

It is understood that my invention is not limited to this use in a mine and this one application illustrates the many places the equipment is useful.

In each of the two views like reference characters are used to designate similar parts.

Referring to Fig. 1, the reference character RA designates the track rails of a mine track over which mine locomotives are operated, only one rail being shown in the drawing for the sake of simplicity. The reference character TW designates a trolley wire from which the electric locomotives collect propulsion power. This trolley wire TW is suspended by hangers HA spaced at short intervals. These hangers may be of different forms and in the usual construction each is secured to the roof of the mine through a suitable fastening and each hanger includes an insulation portion or insulator 10 so that the trolley wire is normally insulated from the mine roof.

A propulsion power source, usually in the form of a direct current generator not shown, has one terminal connected to the trolley wire and its other terminal connected to the rails, the rails being bonded to form a return path for the propulsion current.

It is clear that as long as the insulation portion of each hanger HA is intact, little or no current leaks from the trolley wire into the roof and thence to the rails, but if the insulator of a hanger becomes short circuited or broken down, the full propulsion voltage is impressed between the trolley wire and the roof and a relatively large current leaks into the roof and thence to the return rail system. As stated hereinbefore, the heat created by this leakage current may be so intense as to cause a fire, since the roof in coal mines is more or less combustible and in all mines there is an accumulation of dust that is combustible. A fire may become the cause of an explosion and thereby endanger the lives of the miners.

It is also clear that the leakage current is a loss of power, and, if there are several faulty insulators, the resulting leakage current may seriously impair the operation of the system.

According to my invention, I provide test equipment that includes a pair of primary coils P1 and P2 and a pair of secondary coils S1 and S2.

The primary coils P1 and P2 are preferably alike and are connected across capacitors C1 and C2, respectively. These primary coils are symmetrically spaced with the planes of both in a common plane, so that the two coils when brought adjacent the trolley wire TW have substantially the same inductive relationship to the trolley wire. Also, the two capacitors C1 and C2 are made adjustable so that each primary coil and its capacitor can be readily tuned to resonance at a given frequency.

The secondary coils S1 and S2 are preferably alike and are loosely coupled to the primary coils P1 and P2, respectively, and the two secondary coils are disposed so that the inductive relationship of the secondary coil S1 with respect to its primary coil P1 is substantially the same as that of the secondary coil S2 with respect to its primary coil P2. Secondary coils S1 and S2 are included in series in a tuned circuit that includes a tuning capacitor C3 and a resistor R, the secondary coils S1 and S2 being poled to oppose each other.

It is to be seen therefore that when primary coils P1 and P2 are located adjacent the trolley wire TW and an alternating current is passed through the trolley wire, equal voltages are induced in the primary coils P1 and P2 which cause substantially equal currents to flow in the two coils by proper adjustment of the capacitors C1 and C2. Such currents flowing in the primary coils induce equal voltages in the secondary coils S1 and S2 owing to the symmetrical relationship and identical construction of the coils. Since the coils S1 and S2 are differentially connected in the tuned circuit including capacitor C3 and resistor R, no voltage is created across resistor R when like voltages are induced in the secondary coils. However, if the primary coils P1 and P2 are placed under a hanger HA having a faulty insulator so that a portion of the alternating current flows through the insulator into the roof, the voltage induced in the primary coils P1 and P2 will be unequal when the hanger is between the coils. This difference in the induced voltages in the primary coils will create a corresponding difference in the voltages induced in the secondary coils S1 and S2 and the difference of the secondary coil voltages will create a corresponding voltage across the resistor R.

A meter M is connected across resistor R, the connection preferably including a full wave rectifier 11 and the meter M being of the direct current type.

To test the insulator of any one of the hangers HA, a periodic or alternating current source, such as a generator 12 is connected between the trolley wire TW and the rails through a temporary connection in the vicinity of the hanger to be tested. Also a load resistor 13 and a blocking capacitor 22 are temporarily connected between the trolley wire and the rails at a second point not too far remote from the hanger to be tested. The primary coils P1 and P2 would be first placed adjacent the trolley wire with no hanger between them and at this position of the coils the capacitors C1, C2 and C3 would be adjusted in the order named until there is substantially a zero reading of the meter M. The primary coils then are placed adjacent the trolley wire with the hanger to be tested between them, and under such conditions a faulty insulator will be detected by a reading in the meter due to unequal current flowing in the trolley wire past the two primary coils because a portion of the alternating current will flow through the faulty insulator from the trolley wire into the roof.

To facilitate testing of the thousands of hangers of a mine, I arrange the test equipment as shown in Fig. 2. Referring to Fig. 2, a mine locomotive LO operates over the rails RA and is provided with a normal trolley pole TP for collecting propulsion current from the trolley wire TW, such propulsion current being supplied between the trolley wire and rail by a generator not shown, and which propulsion current is generally of the order of 200 to 600 volts direct current.

The primary coils P1 and P2, secondary coils S1 and S2, capacitors C1, C2 and C3 and resistor R of the test equipment are assembled in a unit indicated as a whole by the reference character TU. This unit TU is adaptable of being carried on an auxiliary trolley pole STP mounted on the locomotive with two swivel joints 24 and 25 so that the unit TU mounted on the upper joint 25 will always ride on the trolley wire in the same position. The unit TU is provided with a case or housing of good insulation material to protect the test equipment from the high voltage propulsion current and preferably two wheels 14 and 15 are journaled in the housing in a position to follow the trolley wire TW so that the unit always has a definite position with respect to the trolley wire as the locomotive moves along the track. The several coils of the unit TU are arranged in the housing of the unit in a manner for the coils to have a symmetrical relationship with respect to the trolley wire and with respect to each other as explained for the coils of Fig. 1. The resistor R of the unit TU is connected to a meter unit MU through a cable 16.

The meter unit MU includes the rectifier 11 and meter M of the equipment of Fig. 1, and the unit MU is arranged that it can be carried on the locomotive LO at any convenient point for an operator riding on the locomotive to read the meter.

A source of periodic or alternating current is provided on the locomotive LO, such source being shown conventionally at 17. This source of alternating or periodic current may, for example, be a small motor generator to generate the proper voltage of alternating current which is supplied to a primary winding 18 of an output transformer, a secondary winding 19 of which transformer has one terminal grounded to the locomotive frame and its other terminal connected to the trolley wire through the usual trolley wheel, wire 20 and a blocking condenser 21. A temporary connection 23 for the alternating current to flow from the trolley wire to the ground may be provided and connected in the vicinity of the hangers to be tested. However, the source 17 may be arranged to provide a relatively high carrier frequency so that current flows in the trolley wire due to the distributed capacitance and inductance of the trolley wire to the rails and ground. In this latter case the temporary connection 23 including the capacitor 22 may be omitted.

To adjust the test equipment, the unit TU would be placed adjacent the trolley wire at a point with no hanger between the coils and the capacitors C1, C2 and C3 adjusted in the order named to provide a zero reading of the meter M as explained in connection with the apparatus of Fig. 1.

The locomotive LO can then be run slowly over the rails to bring the unit TU successively under each hanger. As long as the unit TU moves along the trolley wire between hangers and under each hanger having a good insulator no reading in indicated at the meter MU, but when the unit TU passes a hanger having a faulty insulator an indication at the meter is created due to the unequal voltages induced in the coils because a portion of the alternating current flows through the faulty hanger insulator from the trolley wire into the roof.

Test equipment such as here disclosed has the advantages that it is of simple and economical construction, and is of a construction that it can be placed on a locomotive and the insulators of the hangers of a trolley wire of a mine rapidly checked by running the locomotive over the track.

Although I have herein shown and described but one form of test equipment for faulty electrical insulators embodying my invention, it is understood that various changes and modifications may be made therein within the scope of the appended claims without departing from the spirit and scope of my invention.

Having thus described my invention, what I claim is:

1. In test equipment for electrical insulators used in trolley wire hangers of mine railways, the combination comprising, means to at times supply an alternating current to said trolley wire, a pair of primary coils symmetrically spaced and portable to be located adjacent said trolley wire with any selected one of said hangers between them, each said primary coil connected across an individual tuning capacitor to create a current in the coil due to the voltages induced in the coil by the alternating current flowing in said trolley wire, each said primary coil and its capacitor forming a circuit tuned to resonance at the frequency of the alternating current and which circuits are proportioned to create coil currents of substantially equal value in response to the voltages induced in the coils when an equal value of the alternating current flows in the trolley wires past each coil, said coil currents being of different values in response to voltages induced in the coils when more alternating current flows past one coil than the other due to a faulty insulator of the hanger between the coils, a pair of secondary coils one coupled to each of said primary coils, said secondary coils connected in series through a resistor to create a voltage across the resistor proportional to the difference in the voltages induced in the secondary coils in response to the currents created in said primary coils, and an indicating device connected across said resistor governed by the voltage thus created across the resistor.

2. In test equipment for electrical insulators used in trolley wire hangers of mine railways, the combination comprising, means to at times supply an alternating current to said trolley wire, a first test unit including a pair of primary coils and a pair of secondary coils, said test unit adapted to be carried on a trolley pole of a locomotive of the mine railway to bring the unit adjacent the trolley wire, said primary coils spaced apart in the unit and disposed for like inductive relationship with the trolley wire to pick up like voltages when an equal value of the alternating current flows past each primary coil and which voltages are unequal when a hanger having a faulty insulator comes between the primary coils as the locomotive moves along the railway due to the alternating current leaking through such faulty insulator, each said primary coil included in a circuit individual to the coil to create a current flow in the circuit due to the voltage induced in the coil, said secondary coils coupled one to each primary coil and differentially connected together to develop a voltage due to the currents flowing in said circuits of the primary coils when the voltages picked up by the primary coils are unequal, and a meter unit including an indicating device portable to be carried on the locomotive and connected in series with said secondary coils to govern the indicating device according to such developed voltage.

3. In test equipment for electrical insulators used in trolley wire hangers of mine railways, the combination comprising, a source of alternating current mounted on a locomotive of said mine railway and having connections to at times supply alternating current to the trolley wire, a test unit including a pair of primary coils and a pair of secondary coils, said test unit adapted to be carried on an auxiliary trolley pole of the locomotive to bring the unit adjacent the trolley wire as the locomotive moves over the railway, said primary coils spaced for like inductive relationship to the trolley wire and each connected across an individual capacitor to form a circuit tuned to resonance at the frequency of said alternating current and which circuits are proportioned to create currents of substantially equal values in the primary coils due to the voltages induced in the primary coils when an equal value of alternating current flows in the trolley wire past each primary coil and coil currents of different values due to the voltages induced in the primary coil when more alternating current flows in the trolley wire past one primary coil than past the other due to a faulty insulator of a hanger coming between the primary coils as the locomotive moves over the railway, said secondary coils coupled one to each of said primary coils and oppositely connected in series through a capacitor and a resistor to create a voltage across the resistor in response to unequal primary coil currents, and a meter unit including an indicating device carried on the locomotive and having connection across said resistor to indicate such voltage created across the resistor.

ANDREW J. SORENSEN.

REFERENCES CITED

The following references are of record in the file of this patent:

UNITED STATES PATENTS

| Number | Name | Date |
|---|---|---|
| 1,475,749 | Chubb | Nov. 27, 1923 |
| 1,745,419 | Henneberger | Feb. 4, 1930 |
| 1,835,255 | Anderson | Dec. 8, 1931 |
| 2,142,304 | Cummings | Jan. 3, 1939 |
| 2,269,584 | Eldredge | Jan. 13, 1942 |

FOREIGN PATENTS

| Number | Country | Date |
|---|---|---|
| 383,439 | Great Britain | Nov. 17, 1932 |